May 24, 1949.
R. D. NYE ET AL
2,471,345
METHOD OF OBTAINING CONCENTRATES OF URANIUM
AND VANADIUM FROM THEIR ORES
Filed Feb. 10, 1944
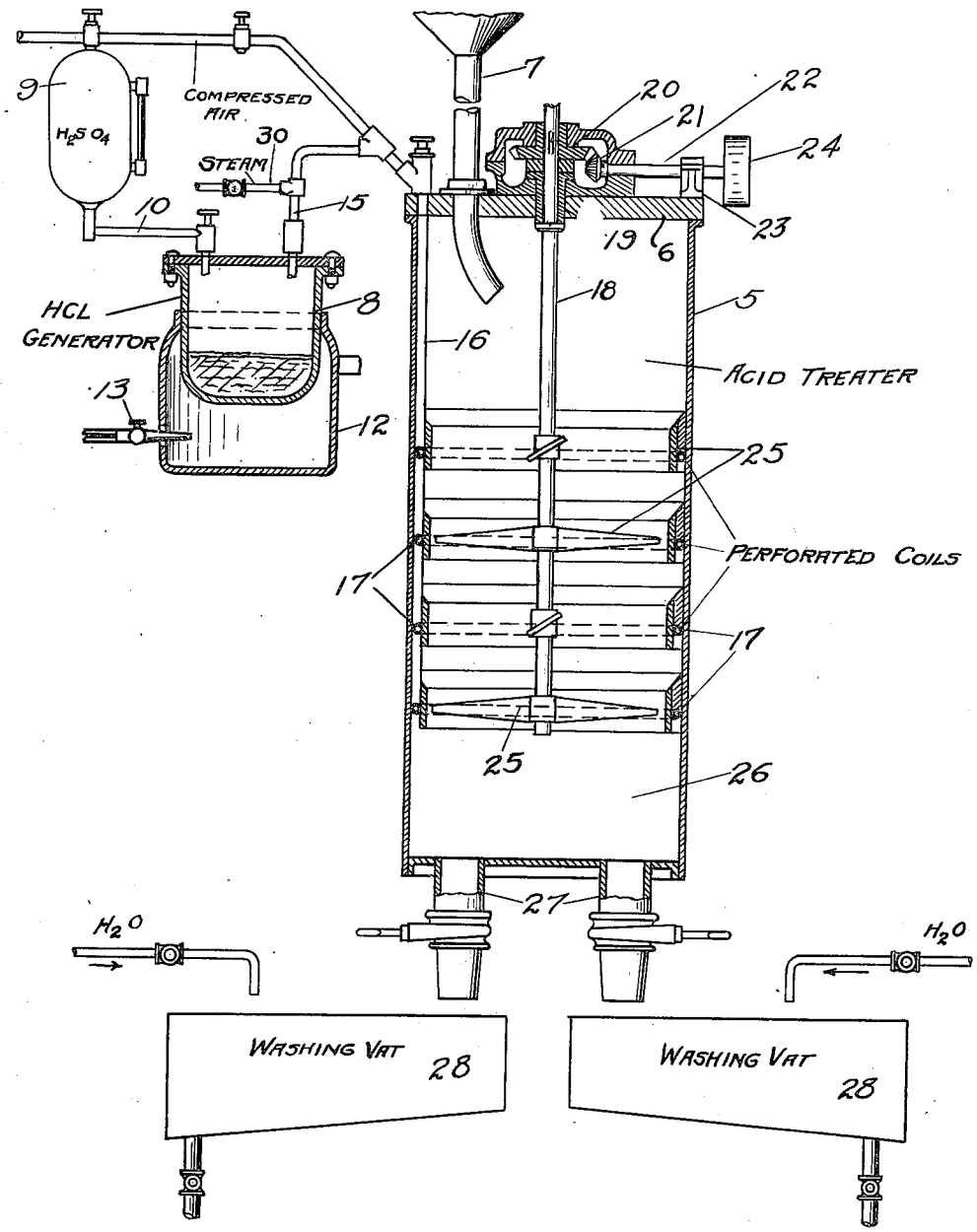
Inventor
Ralph D. Nye and
Dana J. Demorest
By W. D. McDowell
Attorney Patented May 24, 1949

2,471,345

UNITED STATES PATENT OFFICE 2,471,345

METHOD OF OBTAINING CONCENTRATES OF URANIUM AND VANADIUM FROM THEIR ORES

Ralph D. Nye and Dana J. Demorest, Columbus, Ohio

Application February 10, 1944, Serial No. 521,840

5 Claims. (Cl. 23—14.5)

This invention relates to an improved process and apparatus for treating carnotite and similar uranium and vanadium-containing ores, the general object of the invention being to provide an improved method and means for processing such ores, whereby to concentrate the desired minerals and procure compounds of uranium and vanadium.

It is one of the important objects of the present invention to provide an improved method and apparatus especially adapted for treating low-grade ores of the type which contain compounds of uranium and vanadium in such small percentages as to preclude, without treatment, their commercial utilization, whereby through novel procedural steps, we are enabled to recover concentrates from such ores containing the desired mineral values in quantities admitting of their ready employment in various industrial capacities.

In order to render such an operation economical and feasible, it is necessary that the ore processing or treating cost be kept as low as possible, consistent with efficient operation, so that the recovered concentrates may compete commercially with those obtained from other and often more naturally favorable sources. One of the principal costs involved in the concentration of such ores is that of the acid reagent or reagents used in leaching the said values from the ores. Therefore, it is another important object of the present invention to provide an economical and efficient method and means for forming and utilizing an improved acid reagent to obtain a high ratio of recovery from a standpoint of the amount of reagent used and the cost thereof.

In pursuance of the foregoing object, it is another object of the invention to utilize hydrochloric acid as the treating reagent, forming the latter at the site of the treating operation and introducing the same into initial contact with the ores to be leached while the reagent is in a heated, volatile or gaseous state.

It is a further object of the invention to provide a method and apparatus for separating uranium and vanadium values from their ores in which the latter are introduced in a finely divided form into a treating receptacle, and, while in said receptacle, are subjected to agitation and intimate admixture and contact with hydrochloric acid in an initially heated and gaseous state, whereby to obtain effective contact between the reagent and the ore particles, the receptacle being so formed as to provide in the lower part thereof an unheated receiving chamber in which the reagent is caused to condense in concentrated form on the ore grains, thereby reacting with the acid soluble uranium and vanadium compounds to admit of their subsequent and ready separation from the insoluble and undesired ore grains.

Still, a further object of the invention is to provide a process and apparatus of the character indicated in which the volatilized hydrochloric acid reagent is developed, in situ, by the interaction of sulphuric acid with sodium chloride in a heated retort, provision being made for conducting the heated acid gas to the mixing receptacle containing the ore to be treated thereby.

For a further understanding of the invention, reference is to be had to the following description and the accompanying drawing, in which the figure is a diagrammatic view, partly in vertical section, disclosing apparatus suitable for carrying out the purposes of the present invention.

While the apparatus used in obtaining the ends of the present invention is, of course, subject to considerable variation and modification, a simple and practical embodiment, used herein for purposes of illustration and description, comprises a vertically disposed tank or receptacle 5. The ore to be treated, prior to being introduced into the receptacle, is crushed and sized to pass, for example, through a 50 mesh screen. The crushed ore in a water-dampened state is then passed through the conduit 7 and deposited within the receptacle for intimate commingling with the acid reagent, in this instance, hydrochloric acid. We have discovered that in the treatment of such ores with hydrochloric acid, the process is rendered both economical and efficient by generating the hydrochloric acid locally, and while the same is in a volatile or gaseous state, introducing it into the receptacle so that it may be thoroughly admixed with the finely divided ore particles and thereafter caused to be absorbed in the moisture present on the surfaces of the dampened ore particles.

Hydrochloric acid in a gaseous state may be generated, in accordance with the present invention, by placing sodium chloride in a heated retort, such as that indicated at 8, and admitting commercial sulphuric acid into contact therewith. For this purpose, a sulphuric acid holder, indicated at 9, has the bottom thereof provided with a valved pipe line 10 which extends to the interior of the retort 8. The retort may be suitably supported on a heater casing 12, the latter being provided with a fuel burner 13, or other combustion-creating means. In this operation, the sodium chloride and sulphuric acid first react to form sodium bisulphate and gaseous hydrochloric acid. Then as the heating of the retort is continued and the internal temperature thereof raised to about 300° C., the bisulphate melts to form sodium sulphate, liberating additional quantities of hydrochloric acid for use in the ore receptacle.

The retort is provided with an outlet conduit 15 through which volatiles generated within or otherwise introduced into the retort are transferred to a vertically extending manifold 16 positioned within the tank or receptacle 5. The manifold is connected with a plurality of horizontally arranged and vertically spaced outlet coils 17, arranged adjacent to the inner wall of the tank, and through the perforations of which coils, the heated gaseous constituents, obtained from the retort, are discharged, such constituents thus coming into intimate contact with the crushed ores. To further promote such intimacy of contact between the reagent and the ores, the tank is provided centrally with a shaft 18 which has its upper end journaled in a bearing 19 carried by the top wall shown at 6.

Fixed to the upper end of the shaft is a beveled gear 20 which meshes with a pinion 21 mounted on the inner end of a drive shaft 22, the latter being journaled, as at 23, on the top of the tank. The outer end of the shaft is provided with a belt wheel 24 driven by any suitable prime mover. The shaft depends within the tank, and in registration with the coil 17, is provided with agitating blades 25. Below the agitating blades or paddles, the tank is provided with a reacting space or chamber 26 where the ore remains for a sufficient time to react with the acid before being drawn off to leaching and separating equipment associated therewith. Except for the heat of the volatiles introduced therein by way of the manifold 16 and the coil 17 and exothermic heat generated by chemical action on the ore, the treating tank or receptacle is unheated. Also, the crushed ores introduced into the upper part of the receptacle are unheated and may be somewhat wetted. As a result, a temperature gradient is established within the receptacle, so that the hydrochloric acid gas condenses and dissolves into the moisture on the surfaces of the sand grains of the ore. This results in forming a concentrated reagent which unites with the uranium and vanadium compounds to form chlorides, the latter being soluble in water so that the same may be readily leached or washed from the ore body following discharge of the latter from the receptacle.

The bottom of the receptacle is formed with one or more valved outlets 27 which provides for the discharge of the acid coated ores into one or more leaching vats indicated at 28. In the vat 28, separation of the hydrocloric acid solution containing the uranium and vanadium values takes place. While in the vat 28, the ores may be water washed so that the acid dissolved values may be thoroughly flushed from the ores by one or more washing operations. Thereafter, the value-containing acid solution is treated to separate uranium and vanadium. For instance, by the method disclosed in our prior co-pending application, Serial No. 487,464, filed May 18, 1943, now abandoned, of which this application in a continuation-in-part, or by any other appropriate treatment.

We find that the vanadium oxides in the ores which we have treated often occur in the pentavalent form ($V_2O_5$) which forms $H_3VO_4$ when acid treated. In this form, the vanadium is not entirely precipitated by sodium carbonate, the latter compound being employed when uranium compounds are separated from vanadium compounds. It is, therefore, desirable to reduce such pentavalent vanadium oxides to the quadrivalent form ($V_2O_4$), since the latter is substantially insoluble in a solution of sodium carbonate, thus facilitating separation of the vanadium component from uranium when the sodium carbonate treatment is employed.

To reduce the pentavalent oxide to the quadrivalent form, sulphur dioxide may be generated with the hydrochloric acid by placing in the retort 8 some form of carbon, such as coal or sawdust, and which, when heated, will react with the sulphuric acid to liberate sulphur dioxide. This $SO_2$ gas is forced into the wetted ore contained in the receptacle or tank 5 with HCl gas in order that the pentavalent oxide thus present and so contacted may be reduced to the quadrivalent form. Only a very small quantity of $SO_2$ is required, which can be controlled by the amount of coal used in the acid generator.

After the retort or acid generator 8 has been operated for a certain period of time, the same should be opened and the residues therein removed. For this reason, a pair of such retorts may be employed to sustain continuous operation, the retorts being operated alternately to provide for residue removal. If only HCl gas is produced from the interaction of sodium chloride and sulphuric acid, a residue of sodium sulphate remains, the same adhering to the walls of the retort and forming a hard mass which is difficultly removable, but when an organic substance, such as coal or sawdust, is placed in the bottom of the retort to form sulphur dioxide, and other incidental gases, hydrocarbons are evolved and caused to pass through the sodium chloride, so that the residue of sodium sulphate does not form into a hard solid mass adhering to the retort walls. After all acid gases are formed, water may be forced slowly into the retort to generate steam, which is delivered to the treating receptacle. The water so introduced may be used, also, to cool the retort and further soften the salt cake to facilitate its removal.

By means of our improved process and the apparatus employed in connection therewith, low-grade ores containing compounds of uranium and vanadium may be economically treated to obtain commercially suitable concentrates of the uranium and vanadium compounds. The apparatus is suitable for use in the remote locations where ores of the character described are generally mined and where transportation difficulties are encountered, since the treating re-agents consist principally of readily obtainable salt and sulphuric acid and these reagents are used in a sparing, highly efficient and economical manner.

It will be noted that the receptacle or tank constitutes a confined treating zone by which the acid reagent is intimately admixed with and, upon absorption, is distributed over the crushed ore particles in high concentration. The concentrated acid collects in a film-like manner on the ore particles, combining with the uranium and vanadium compounds present in the ore to form water-soluble compounds. The temperatures of the treating zone are, of course, subject to regulation, as by governing the temperature of the incoming ore and/or that of the acid gas, so that toward the bottom of the treating zone, usually below the agitators, the gases or vapors are sufficiently lowered in temperature through contact with the ore particles, or by loss of heat through the walls of the receptacle, to effect absorption of the acid gas and the formation of the acid films on the ore particles. During such reaction, there is insufficient water present to form any continuous liquid or acid solution phase from which the acid gas may be evolved. Upon discharge of the acid treated ores from the bottom of the treating zone, through which the ores descend by gravity, the said acid-treated ores are in condition to provide for the drainage and washing of the value-containing solution therefrom, the spent or undesired sands of such ores being removed in a separate state from the washing vats.

The value-containing solutions then may be treated in any desired manner to separate the uranium from the vanadium compounds in order to recover these materials as separate concentrates or, if desired, the same may be in a commingled form. Such processes of separation have been set forth in our aforesaid co-pending application or in our United States Patent No. 2,173,523 dated September 19, 1939, and in our co-pending application, Serial No. 426,174, filed Jan. 9, 1942, now abandoned.

Compressed air may be employed for effecting a forced discharge of the sulphuric acid from the holder therefor into the gas generator and also to admit compressed air into the manifold leading to the gas outlet coils of the acid treater. Also, steam may be introduced, as at 30, in limited quantities into the gas outlet line leading from the gas generator or retort to the acid treater. Water formed as a result of the condensation of the steam admitted into the treater may be used in forming a part of the solution in which the leached values are contained, particularly if the ores are comparatively dry when introduced into the treater or lixiviating zone, since the ores should be in a damp or lightly wet condition, as they usually are, when admitted to the treater. By having the ores in a somewhat wetted state, the hydrochloric acid gas will condense in the moisture present. It will be understood that water may be present as dampness in the ore, or such dampness may be artificially created through the admission of steam into the acid treating zone with the hydrochloric acid gas, steam having the advantage of helping to warm or heat the ore.

We claim:

1. In a process for producing concentrates from uranium and vanadium-containing ores, the steps which comprise agitating a crushed finely divided water-dampened body of such ores in a confining receptacle, introducing into said receptacle for intimate engagement with said ores a dry hydrochloric acid gas in a heated state, maintaining the ores within the receptacle at such temperatures as to cause the gaseous hydrochloric acid to be absorbed in the moisture present on the damp surfaces of the crushed ore grains and forming a highly concentrated aqueous hydrochloric acid solution, there being insufficient water present during said reaction to form any continuous liquid or acid solution phase from which the acid gas may be evolved, and thereafter separating from said ores by a washing operation a hydrochloric acid solution of uranium and vanadium.

2. In a process of obtaining compounds of uranium and vanadium from their ores, the steps which comprise bringing dry hydrochloric acid gas into intimate permeating contact with a water-dampened body of said ores, controlling the temperature of the resulting mixture to effect absorption of the hydrochloric acid gas in the moisture present on the dampened surfaces of the ore grains to form on said grains a highly concentrated aqueous hydrochloric acid solution, there being insufficient water present to form any continuous liquid or acid solution phase from which the acid gas may be evolved, and thereafter separating from the ores water-soluble compounds of uranium and vanadium.

3. In a process of recovering concentrates of uranium and vanadium from their native ores, the steps which comprise mechanically reducing such ores to a finely divided state, water-wetting said ores sufficiently to dampen the same, while the dampened ores are positioned in a confined treating zone bringing the same into intimate contact with a substantially dry hydrochloric acid gas in a heated state, regulating the temperatures of the treating zone to cause the acid gas to be absorbed in the moisture present on the damp surfaces of the ore grains, whereby to form on said grains a highly concentrated aqueous hydrochloric solution which reacts with the uranium and vanadium compounds present in the ore to form water-soluble compounds thereof, there being insufficient water present to form any continuous liquid or acid solution phase from which the acid gas may be evolved, and thereafter separating the water-soluble compounds of uranium and vanadium from the ore sands.

4. In a process for obtaining concentrates of uranium and vanadium from their native ores, the steps which comprise: mechanically crushing a body of such ores to reduce the same to a finely divided form, water-wetting said ores sufficiently to dampen the surfaces of the grains thereof, then passing the crushed and wetted ores into a confined treating zone, subjecting the ores while in said zone to mechanical agitation, while the ores are being so agitated intimately contacting the same with hydrochloric acid gas in a heated and substantially dry state, prior to the withdrawal of the ores from said zone maintaining the same at such temperatures as to effect absorption of the hydrochloric acid gas in the moisture present on the damp surfaces of the crushed ore grains whereby to form a highly concentrated aqueous hydrochloric acid solution, there being insufficient water present to form any continuous liquid or acid solution phase from which acid gas may be evolved, maintaining the ores within said zone for a sufficient period of time to effect inter-action between said acid solution and the uranium and vanadium values of the ore in order to effect the formation of water-soluble compounds in which said values are present, removing the acid-treating ores from said zone, and subjecting the removed ores to a water-washing operation to separate therefrom said water-soluble compounds.

5. In a process for producing uranium and vanadium concentrates from their ores, the steps which comprise reducing such ores to a finely divided physical form, lightly wetting said ores with water, then subjecting the ores to mechanical agitation while the same are retained in a confined treating zone, during such agitation intimately contacting said ores with a substantially dry hydrochloric acid gas in a heated state and in admixture with sulphur dioxide, maintaining the ores within said zone for a sufficient period of time and under such temperatures as to effect absorption of the hydrochloric acid gas in the moisture present on the individual grain particles of the ore and concomitantly reduce pentavalent vanadium oxide present in said ores to a quadravalent form, there being insufficient water present to form any continuous liquid or acid solution phase from which the acid gas may be evolved, removing the ores from said treating zone, and through a washing operation separating therefrom water-soluble compounds in which the uranium and vanadium values are contained.

RALPH D. NYE.
DANA J. DEMOREST.

REFERENCES CITED

The following references are of record in the file of this patent:

UNITED STATES PATENTS

| Number | Name | Date |
|---|---|---|
| 1,450,507 | Mackay | Apr. 3, 1923 |
| 1,495,538 | Thews | May 27, 1924 |
| 1,729,431 | Adamson | Sept. 24, 1929 |
| 1,868,946 | Low | July 26, 1932 |
| 2,053,834 | Kachkaroff | Sept. 8, 1936 |

FOREIGN PATENTS

| Number | Country | Date |
|---|---|---|
| 289,245 | Germany | Dec. 9, 1915 |
| 567,571 | Germany | Jan. 5, 1933 |